Sept. 16, 1958 L. M. DOLHUN Re. 24,536

SEAL

Original Filed May 15, 1951 2 Sheets-Sheet 1

INVENTOR.
Leonard M. Dolhun,
BY
Cromwell, Grist & Warden
Attys.

SEAL

Original Filed May 15, 1951 2 Sheets-Sheet 2

INVENTOR.
Leonard M. Dolhun,
BY
Cromwell, Greist & Warden
Attys.

United States Patent Office

Re. 24,536
Reissued Sept. 16, 1958

24,536

SEAL

Leonard M. Dolhun, Chicago, Ill., assignor to Chicago Rawhide Manufacturing Company, Chicago, Ill., a corporation of Illinois Original No. 2,701,154, dated February 1, 1955, Serial No. 226,415, May 15, 1951. Application for reissue January 30, 1957, Serial No. 639,596

17 Claims. (Cl. 288—3)

Matter enclosed in heavy brackets [ ] appears in the original patent but forms no part of this reissue specification; matter printed in italics indicates the additions made by reissue.

The present invention relates to seals of the type commonly applied to a pair of relatively rotatable parts for the purpose of sealing these parts against the escape of lubricant or other liquid, the undesired entry of dirt and foreign matter, etc. In particular, the invention deals with a seal for such an installation which is wholly self-contained in character, in that it embodies in a pre-assembled unit both a sealing ring and a coacting mating ring against which the sealing ring is resiliently urged for relatively rotative sliding engagement at the meeting surfaces of the rings when the seal is installed.

*It is an object of the invention to provide a self-contained seal in which the sealing ring and mating ring are both received about an axially extending tubular portion of a metal casing member in axially movable relation thereto, the casing member including a further portion which is provided with means for restraining the sealing ring against rotation relative thereto, the casing member anchoring one edge of a diaphragm which along its opposite edge is attached to the sealing ring, the axially extending portion of the casing member being provided with lug-type means which project into the path of axial movement of the mating ring and prevent axial separation of the mating ring from the casing member in response to the action of spring means carried by the casing member which urge the sealing ring into sealing engagement with the mating ring.*

It is [an] *another* object of the invention to provide a self-contained seal of the foregoing sort in which the sealing ring and mating ring are each individually mounted on a sheet metal casing member in a non-rigid relation thereto which casing members provide an external housing for the seal enclosing its operating parts and have means for individually restraining the respective sealing and mating rings in a positive manner against rotation [relative to one another and] relative to [the] *their* respective casing members.

Yet another object is to provide a seal which is very economically produced and quickly and economically assembled as a wholly self-contained unit, as well as installed after assembly in operative relation to a pair of relatively rotatable parts to be sealed, the seal being characterized by two telescoped casing members containing coacting sealing and mating rings, of which the latter is relatively loosely disposed in its casing member in order to avoid objectionably stressing the latter as might occur in force-fitting, and is keyed by the casing member against relative rotation, being axially sustained by the casing member under spring force applied through the sealing ring.

A still further object of the invention is to provide a self-contained seal of the foregoing character, in which the two coacting casing members of the seal, each associated in laterally enclosing relation to one of the rings referred to above, have axially telescoped portions of substantial axial length and provision on said portions for interengaging the same to prevent separation of the casings from one another prior to installation of the seal.

Another object of the invention, in one of its embodiments, is to provide a self-contained seal including a pair of casings mounted in axially telescoped relation to one another, one of said casings having an axially extending, tubular portion or extension of sufficient length to extend substantially entirely through the other casing, in the compressed condition of the seal, for axial abutment with a sealed part which is in fixed relation to the other casing, thereby serving as a means to impart positive sealing thrust against a compressible gasket which is associated with the first-named, extension-bearing casing member.

A still further object of the invention, in another embodiment thereof, is to provide a self-contained seal having axially telescoped, interengageable casing members, one mounting a sealing ring and the other mounting a mating ring, in which the first named casing has an axial re-entrant portion providing circumferentially spaced axially extending lug or key elements which interlock with the sealing ring to restrain rotation of the latter, the re-entrant portion also serving as a centering means for an annular spring which acts between the casing member and associated sealing ring to urge the latter against the mating ring.

The foregoing statements are indicative in a general way of the nature of the invention. Other and more specific objects will be apparent to those skilled in the art upon a full understanding of the construction and operation of the device.

Two embodiments of the invention are presented herein for purpose of illustration, and it will be appreciated that the invention may readily take other modified forms coming equally within the scope of the appended claims.

Figure 2:
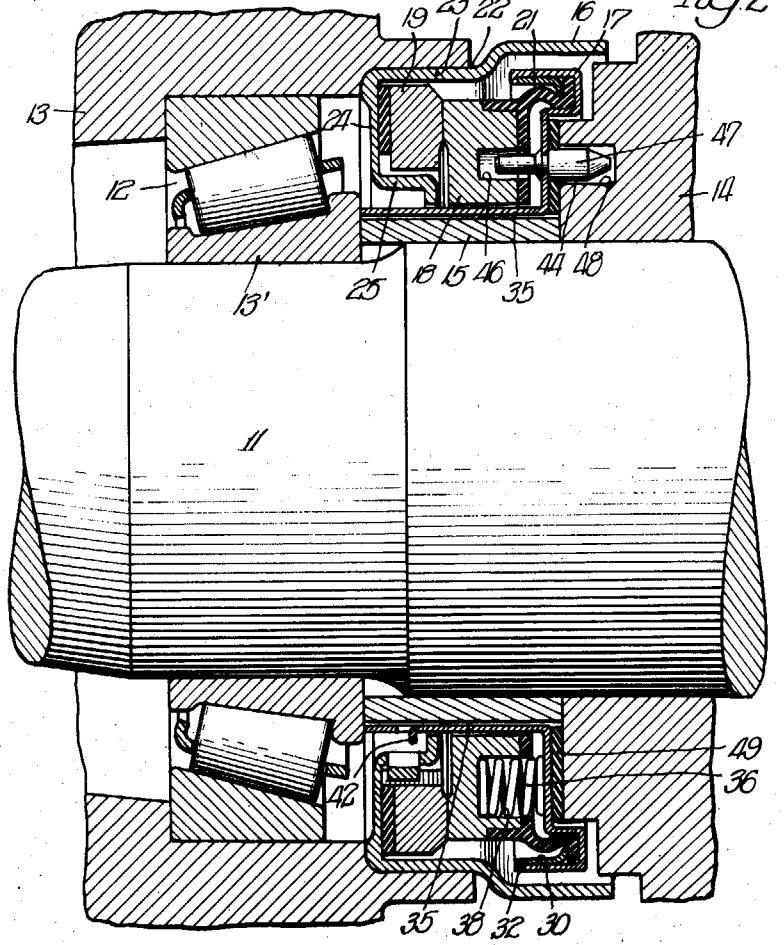
Fig. 2 is a fragmentary view in section similar to Fig. 1, illustrating the seal in a typical installation between a housing and roller bearing-mounted shaft associated with the housing.
Figure 1:
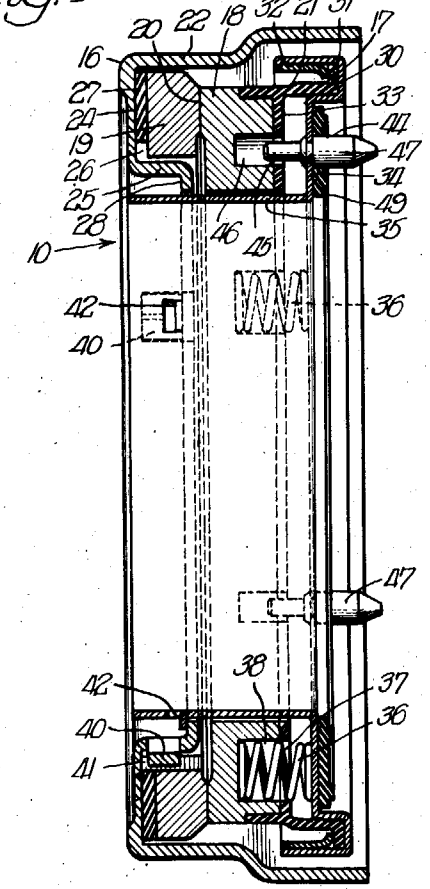
Fig. 1 is a view in longitudinal or axial section through the subject self-contained seal in accordance with one embodiment thereof, illustrating the component parts thereof in an expanded condition prior to installation of the seal.

Referring to Figs. 1 and 2 of the drawings, the reference numeral 10 generally designates a seal embodying in one form the principles of the invention, as for the oil and dust sealing of a shaft 11 rotatably mounted at a bearing 12 in a housing 13 or the like. A shaft-carried member 14 is appropriately secured to the shaft, being spaced from the bearing 12 by a sleeve-like shim 15 which also rotates with the shaft and the inner race 13' of bearing 12.

Generally considered, the seal 10 is made up of an outer casing member 16 in the form of a hollow, sheet metal stamping of re-entrant, cupped cross-sectional outline; and inner, axially flanged, deep drawn sheet metal casing member 17; a sealing ring 18 of bronze or other suitable material and coacting steel mating ring 19 against which the sealing ring has relatively rotatable, running engagement at the sealing surface 20; and a flexible diaphragm 21 which is clamped at opposite marginal extremities thereof to the sealing ring 18 and to the casing member 17 with which that ring is associated.

The outer casing member 16 is characterized by an outer axially elongated shell portion 22 which is of substantial length and has a slight radial offset adapted for frictional, force-fitted engagement in a recess 23 of the housing 13, or equivalent part to be sealed, as illustrated in Fig. 2. The remainder of the shell portion 22 serves to physically protect the enclosed portions of the seal. A radial rear wall 24 extends inwardly from the shell portion 22 and is in turn bent reversely at a right angle to form a re-entrant flange portion 25 paralleling the shell portion.

The shell, rear wall and flange portions define an annular space 26 in which the mating ring 19 is relatively loosely received, it being the object to thus avoid undue stressing of the stamped casing member such as would characterize a force-fitted engagement of the mating ring and casing member. A resilient compressible gasket 27 is interposed between the rear of mating ring 19 and the rear radial wall 24 of the casing member 16. The re-entrant flange portion 25 is terminally bent inwardly to form a continuous radially disposed restraining rim 28 for a purpose to be described. *The elements described constitute a mating ring assembly.*

The inner casing member 17 is shaped adjacent its outer periphery to provide a circumferential channel or groove 30 which opens forwardly in the axial direction, i. e., towards the mating ring 19. This channel receives the radially flanged marginal rim 31 of the flexible diaphragm 21, fabricated of rubber, synthetic rubber or the equivalent. A clamping ring 32 is secured in the channel by an inturned edge on the rim of the latter, the rounded nose thereof engaging the diaphragm rim 31 and securing the same in fixed relation to the casing member 17. The other margin of diaphragm 21 is appropriately secured to sealing ring 18, as by shaping the same in L-shaped outline and bonding the same in a correspondingly relieved annular rabbet 33 on the rear and outer surfaces of the sealing ring. Thus diaphragm 21 serves to prevent entry of foreign matter or escape of lubricant or other material between casing member 17 and its associated sealing ring 18.

Casing member 17 extends integrally from the channeled portion 30 in the form of a rear radial wall 34, which in turn integrally joins a forwardly *axially* extending, tubular sleeve extension *portion* 35 which is of substantial length. As illustrated, the extension 35 is sufficiently long to extend entirely through the opposed casing member 16 when the seal is operatively compressed in installed position (see Fig. 3). The free edge of the sleeve portion thus abuts the inner race 13' of bearing 12, serving as a stop to determine the maximum compression of the seal, and also performing another important function, to be later described. Sleeve portion 35 surrounds the spacing shim 15 in axially spaced relation to the latter.

The sealing ring 18 is resiliently urged against mating ring 19 by means of a plurality of uniformly distributed coil springs 36 which rearwardly abut the radial wall of casing member 17. They extend through apertures 37 formed in the radial portion of diaphragm 21 which is bonded to the sealing ring and are received in recesses 38 formed in the rear of that ring.

The mating ring 19 and sealing ring 18 are each positively restrained from rotation relative to the casing member with which they are associated, hence relative to the part to be sealed which is fixedly engaged by that casing. In the case of the mating ring this function is performed by a set of guide lugs 40, formed by slitting and outwardly off-setting the material of the re-entrant flange 25 of casing member 16. These lugs are engageable in correspondingly spaced axial grooves 41 formed on the inner periphery of mating ring 19. The relationship is such that the mating ring is readily dropped into place in recess 26, the lugs 40 slidably entering the grooves 41, and preventing in a positive fashion relative rotation of the mating ring and its casing in operation.

The sealing ring 18 is restrained from rotation relative to its casing member 17, in addition to the inherent restraining action of diaphragm 21, by means of a series of axially extending pins 44 which are fixed on the rear radial wall 34 of the casing member. These pins have forward portions 45 which extend into correspondingly spaced small recesses 46 formed in the rear of the sealing ring 18. The rear portions 47 of the pins are adapted to extend into and interlockingly engage with correspondingly spaced recesses 48 in the shaft-carried member 14 against which the seal abuts, as illustrated in Fig. 2.

The last named pin portions also serve to center and support a separate annular compressible sealing gasket 49. It will be noted in Fig. 2 that the elongated inner tubular sleeve extension 35 of casing member 17 is abutted against the inner race of bearing 12 in the installation of the seal. This serves to compress the gasket 49 against the shaft-carried part 14, insuring a positively forced seal at that point, rather than relying on the force of coil springs for the purpose. The primary function of the latter is to urge the mating and sealing rings for relatively rotatable engagement and to maintain the mating ring in axially abutting relation to its casing member 16 when the seal is not in its operative installed position.

The casing members 16, 17 are held in assembled, unitary, axially telescoped relation to constitute the self-contained seal construction by *lug* means [of] *or* small ears 42 which are slitted and struck outwardly from the material of tubular sleeve extension 35 of casing member 17. These ears are engageable with the restraining rim 28 of the other casing member, in the fashion illustrated in Fig. 1, to prevent separation of the casing members when one or both thereof is axially unsustained, as by the parts with which the seal 10 is associated.

Figure 4:
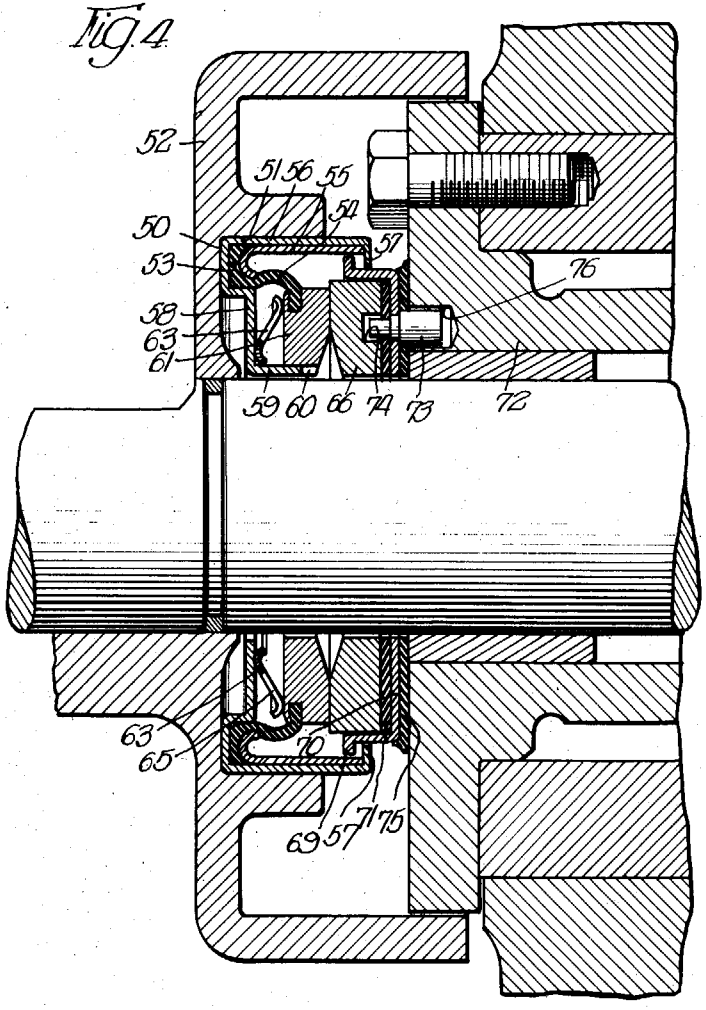
Fig. 4 is a fragmentary view in section similar to Fig. 3, illustrating the seal of that figure in an operative, installed relation to a shaft and housing structure.
Figure 3:
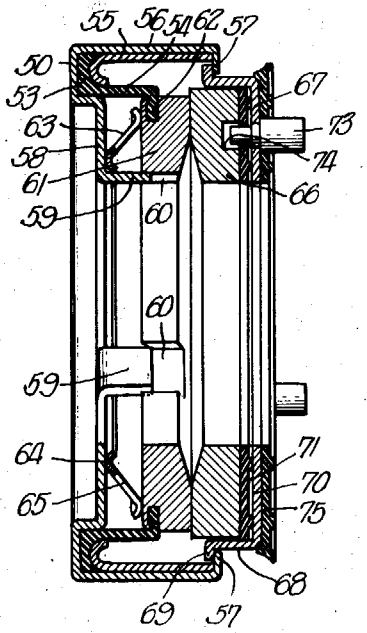
Fig. 3 is a view in longitudinal or axial section through the seal in accordance with a modified embodiment of the invention, showing the same in expanded condition of its parts prior to installation.

Figs. 3 and 4 illustrate a modified embodiment of the principles of the invention. The outer casing member 50 is adapted to be force-fitted in a recess 51 of a part 52 with which the seal is associated. Like the casing member of the first embodiment, it is shaped to provide a re-entrant annular channel 53 which receives the radially flanged outer rim of an annular flexible diaphragm 54. A separate, terminally rolled clamp ring 55 is force-fitted within the elongated, axially extending portion 56 of casing member 50, engaging and clamping the rim of the diaphragm in the channel. The clamp ring is locked in place by an inwardly spun annular lip 57 on the right end margin of the casing.

Casing member 50 continues from the channel portion 53 in a form of a radially extending wall 58 and terminates in a plurality of axially disposed, circumferentially spaced segmental locking lugs 59 of substantial width, as illustrated in Fig. 3. These have axially slidable engagement in similarly spaced axial grooves 60 formed in the inner periphery of the sealing ring 61. The outer periphery of the sealing ring is provided with a circumferential groove or channel 62, in which the radially in-turned margin of diaphragm 54 is fixedly clamped. Ring 61 is preferably hardened only part way back from its running sealing surface, leaving the zone adjoining groove 62 in ductile condition to facilitate clamping of the diaphragm. The sealing ring 61 is axially guided on the locking fingers 59 during the operation of the seal, as well as prevented from rotative movement relative to its casing member.

The aforesaid fingers 59 also serve to center in the space rearwardly of the sealing ring an annular finger spring 63 of known type, characterized by an inner annular body 64 and a plurality of resilient, circumferentially spaced spring fingers 65 which extend in a generally conical arrangement from the body. The rounded ends of these fingers engage the rear of sealing ring 61 to maintain engagement of the latter with a mating ring 66. Other types of spring, for example one in which spring fingers are struck out from an annular body in a circumferentially extending series, may be substituted for finger spring 63.

Mating ring 66 is relatively loosely received in the inner casing member 67 of the seal, being disposed inwardly of an axially extending, outer sleeve-like portion 68 of the latter. This sleeve-like portion terminates in a radially out-turned rim or flange 69 which is adapted to be restrainingly engaged by the radially spun lip 57 of outer casing member 50, as illustrated in Fig. 3, thus to restrain separation of the casing members and associated parts when the seal is not installed.

Inner casing member 67 has a radially extending rear wall 70 which axially sustains the mating ring against the force of spring 63, there being a sealing gasket 71 interposed between the mating ring and the wall.

Casing member 67 is restrained from rotation relative to a sealed part with which it is associated, for example, the flanged shaft hub 72 shown in Fig. 4, by means of a number of axially extending pins 73 secured to casing wall 70. The forward extremities of these pins extend through apertures in gasket 71 and are received in rear recesses 74 of the mating ring; the rear extremities thereof serve to center an outer sealing gasket 75 associated with the casing, and are received in interlocking recesses 76 formed in the part 72.

The seals described above are similar in their operating characteristics. Entry of dirt or foreign matter, or escape of oil or other liquid between the outer casing and sealing ring is prevented by the diaphragm. The running seal between the mating and sealing rings acts similarly with regard to the opening between the casing members and the shaft space internally of the seal. Both seals are entirely self-contained and are responsive without loss of efficiency to end play in operation of the installation. A minimum of parts is employed in the interest of low production cost and the cost of installation is also maintained at a minimum by the arrangements described.

I claim:

1. A self-contained seal for a pair of relatively rotatable parts, comprising an annular casing made up of a first casing member adapted to be disposed in fixed relation to one of said parts, and a second annular casing member mounted in coaxial axially telescoped relation to said first casing member and adapted to be disposed in fixed relation to the other of said parts, a sealing ring associated in concentric axially movable relation to said first casing member, means restraining relative rotation of said sealing ring and its casing member, a flexible annular sealing diaphragm secured at opposite margins to said sealing ring and its associated casing member, a mating ring axially abutted and sustained by said second casing member in relatively rotatable engagement with said sealing ring, and spring means acting axially between said sealing ring and its associated casing member to urge said rings against one another and to maintain said mating ring in axial abutment with its casing member, said second casing member having a sleeve portion extending axially toward engaging surfaces of said sealing and mating rings, which sleeve portion is provided with integral elements extending in opposite radial directions therefrom and engaging said mating ring and said first casing member, respectively, to restrain rotation of said mating ring relative to said second casing member and to prevent axial separation of said casing members under the force of said spring means.

2. A self-contained seal in accordance with claim 1 in which said first casing member includes an axially extending outer portion telescoped within said second casing member and in which a rigid clamp ring is frictionally telescoped in said portion to secure one margin of said diaphragm thereto.

3. A self-contained seal for a pair of relatively rotatable parts, comprising an annular casing made up of a first casing member adapted to be disposed in fixed relation to one of said parts, and a second annular casing member mounted in coaxial axially telescoped relation to said first casing member and adapted to be disposed in fixed relation to the other of said parts, a sealing ring associated in concentric axially movable relation to said first casing member, means restraining relative rotation of said sealing ring and its casing member, a flexible annular sealing diaphragm secured at opposite margins to said sealing ring and its associated casing member, a mating ring loosely received in and axially abutted and sustained by said second casing member in relatively rotatable engagement with said sealing ring, and spring means acting axially between said sealing ring and its associated casing member to urge said rings against one another and to maintain said mating ring in axial abutment with its casing member, said second casing member having a sleeve portion extending axially toward engaging surfaces of said sealing and mating rings, which sleeve portion is provided with integral elements extending in opposite radial directions therefrom and engaging said mating ring and said first casing member, respectively, to restrain rotation of said mating ring relative to said second casing member and to prevent axial separation of said casing members under the force of said spring means.

4. A self-contained seal for a pair of relatively rotatable parts, comprising an annular casing made up of a first casing member adapted to be disposed in fixed relation to one of said parts, and a second annular casing member mounted in a coaxial relation to said first casing member and adapted to be disposed in fixed relation to the other of said parts, a sealing ring associated in concentric, axially movable relation to said first casing member, means restraining relative rotation of said sealing ring and casing member, a flexible annular diaphragm secured at opposite margins to said sealing ring and its associated casing member, said second casing member having an outer portion of substantial length adapted to be frictionally engaged with one of said sealed parts and a re-entrant axially extending portion defining an annular recess between the same and said outer portion, a mating ring loosely received in said recess and axially abutted and sustained by said second casing member in relatively rotatable engagement with said sealing ring, and spring means acting axially between said sealing ring and its associated casing member to urge said rings against one another and to maintain said mating ring in axial abutment with its casing member, said re-entrant, axially extending portion of said casing member being provided with integral elements extending therefrom in opposite radial directions, which elements engage said mating ring and said first casing member, respectively, to restrain rotation of said mating ring relative to said second member and to prevent separation of said casing members under the force of said spring means.

5. A self-contained seal for a pair of relatively rotatable parts, comprising an annular casing made up of a first casing member adapted to be disposed in fixed relation to one of said parts, and a second annular casing member mounted in a coaxial relation to said first casing member and adapted to be disposed in fixed relation to the other of said parts, a sealing ring associated in concentric, axially movable relation to said first casing member, means restraining relative rotation of said sealing ring and casing member, a flexible annular diaphragm secured at opposite margins to said sealing ring and said first casing member, said first casing member including a radial rear wall and an inner tubular portion of substantial length extending forwardly from said rear wall, said second casing member having an outer portion of substantial length adapted to be frictionally engaged with one of said sealed parts and a re-entrant axially extending portion defining an annular recess between the same and said outer portion, a mating ring loosely received in said recess and axially abutted and sustained by said second casing member in relatively rotatable engagement with said sealing ring, and spring means acting axially between said sealing ring and its associated casing member to urge said rings against one another and to maintain said mating ring in axial abutment with said second casing member, said re-entrant, axially extending portion of said second casing member having integral elements extending in opposite radial directions therefrom to engage said mating ring and said inner tubular portion of said first casing member, respectively, to restrain rotation of said mating ring relative to said second casing member and to prevent separation of said casing members under the force of said spring means.

6. A self-contained seal in accordance with claim 5 in which said inner tubular portion of said first sealing ring casing member is of sufficient length to telescope entirely through said second mating ring casing member when the seal is axially compressed, for axial abutment with a part immediately to the rear of said second casing member.

7. A self-contained seal for a pair of relatively rotatable parts, comprising a first annular casing member adapted to be disposed in fixed relation to one of said parts, a second annular casing member mounted in a coaxial relation to said first casing member and adapted to be disposed in fixed relation to the other of said parts, a sealing ring associated in concentric, axially movable relation to said first casing member, means restraining relative rotation of said sealing ring and first casing member, a flexible annular diaphragm secured at opposite margins to said sealing ring and said first casing member, said first casing member including a radial rear wall and an inner tubular portion of substantial length extending forwardly from said rear wall, said second casing member having an outer portion of substantial length adapted to be frictionally engaged with one of said sealed parts and an integral, re-entrant axially extending portion disposed radially inwardly of said outer portion and defining an annular recess between the same and said outer portions, a mating ring loosely received in said recess and axially abutted and sustained by said second casing member in relatively rotatable engagement with said sealing ring, coacting axially telescoped means on said second casing member and mating ring positively restraining relative rotation thereof, and spring means acting axially between said sealing ring and said first casing member to urge said rings against one another and to maintain said mating ring in axial abutment with said second casing member, said casing members having coacting elements on the inner tubular portion of one and on the re-entrant portion of the other which are engageable to prevent separation of the members.

8. A self-contained seal comprising an annular casing made up of a first casing member, a second casing member coaxial therewith, each of said casing members having a ring in coaxial, non-rotative relation thereto, said rings being in relatively rotative, slidable engagement with one another, said first casing including an annular, axially extending sleeve of substantial length about which the ring of that casing member is telescoped, said second casing member including a means defining a re-entrant recess in which the ring of said second casing member is received, said recess defining means including an axially extending, sleeve-like flange portion, said flange portion having an integral element thereon extending radially to engage a portion of the sleeve of said first casing member to prevent separation of the casing members, and having a further integral element thereon extending radially in the opposite direction to engage and prevent rotation of the ring of said second casing member relative to the latter.

9. A self-contained seal for a pair of relatively rotatable parts, comprising an annular casing made up of a first casing member adapted to be disposed in fixed relation to one of said parts, and a second annular casing member mounted in coaxial axially telescoped relation to said first casing member and adapted to be disposed in fixed relation to the other of said parts, a sealing ring associated in concentric axially movable relation to said first casing member, means restraining relative rotation of said sealing ring and its casing member, means sealing said sealing ring in relation to said first casing member, a mating ring axially abutted and sustained by said second casing member in relatively rotatable engagement with said sealing ring, and spring means acting axially between said sealing ring and its associated casing member to urge said rings against one another and to maintain said mating ring in axial abutment with its casing member, said second casing member having a sleeve portion extending axially toward engaging surfaces of said sealing and mating rings, which sleeve portion is provided with integral elements extending in opposite radial directions therefrom and engaging said mating ring and said first casing member, respectively, to restrain rotation of said mating ring relative to said second casing member and to prevent axial separation of said casing members under the force of said spring means.

10. A self-contained seal for a pair of relatively rotatable parts, comprising an annular casing made up of a first casing member adapted to be disposed in fixed relation to one of said parts, and a second annular casing member mounted in a coaxial relation to said first casing member and adapted to be disposed in fixed relation to the other of said parts, a sealing ring associated in concentric, axially movable relation to said first casing member, means restraining relative rotation of said sealing ring and casing member, means sealing said sealing ring in relation to said first casing member, said second casing member having an outer portion of substantial length adapted to be frictionally engaged with one of said sealed parts and a re-entrant axially extending portion defining an annular recess between the same and said outer portion, a mating ring loosely received in said recess and axially abutted and sustained by said second casing member in relatively rotatable engagement with said sealing ring, and spring means acting axially between said sealing ring and its associated casing member to urge said rings against one another and to maintain said mating ring in axial abutment with its casing member, said re-entrant, axially extending portion of said casing member being provided with integral elements extending therefrom in opposite radial directions, which elements engage said mating ring and said first casing member, respectively, to restrain rotation of said mating ring relative to said second casing member and to prevent separation of said casing members under the force of said spring means.

11. A self-contained seal for a pair of relatively rotatable parts, comprising a first annular casing member adapted to be disposed in fixed relation to one of said parts, a second annular casing member mounted in coaxial, axially telescoped relation to said first casing member and adapted to be disposed in fixed relation to the other of said parts, a sealing ring associated in concentric, axially movable relation to said first casing member, means restraining relative rotation of said sealing ring and said first casing member, means sealing said sealing ring in relation to said first casing member, a mating ring loosely disposed in and axially abutted and sustained by said second casing member for relatively rotative engagement with said sealing ring, and spring means acting axially between said sealing ring and said first casing member to urge said rings against one another and to maintain said mating ring in axial abutment with said second casing member, said second casing member having integral elements engaging said mating ring and said first casing member, respectively, to restrain rotation of said mating ring relative to said second casing member and to prevent axial separation of said casing members under the force of said spring means.

12. A self-contained seal for a pair of relatively rotatable parts, comprisinng a first annular casing member adapted to be disposed in fixed relation to one of said parts, a second annular casing member mounted in coaxial, axially telescoped relation to said first casing member and adapted to be disposed in fixed relation to the other of said parts, a sealing ring associated in concentric, axially movable relation to said first casing member, means sealing said sealing ring in relation to said first casing member, a mating ring loosely disposed in and axially abutted and sustained by said second casing member for relatively rotative engagement with said sealing ring, and spring means acting axially between said sealing ring and said first casing member to urge said rings against one another and to maintain said mating ring in axial abutment with said second casing member, said second casing member having a sleeve portion provided with integral elements engaging said mating ring and said first casing member, respectively, to restrain rotation of said mating ring relative to said second casing member and to prevent axial separation of said casing members under the force of said spring means.

13. A self-contained seal for a pair of relatively rotatable parts, comprising a first annular casing member adapted to be disposed in fixed relation to one of said parts, a second annular casing member mounted in coaxial, axially telescoped relation to said first casing member and adapted to be disposed in fixed relation to the other of said parts, a sealing ring associated in concentric, axially movable relation to said first casing member, means restraining relative rotation of said sealing ring and said first casing member, means sealing said sealing ring in relation to said first casing member, a mating ring loosely disposed in and axially abutted and sustained by said second casing member for relatively rotative engagement with said sealing ring, and spring means acting axially between said sealing ring and said first casing member to urge said rings against one another and to maintain said mating ring in axial abutment with said second casing member, said second casing member having a sleeve portion extending axially toward engaging surfaces of said sealing and mating rings, which sleeve portion is provided with integral elements extending in opposite radial directions therefrom and engaging said mating ring and said first casing member, respectively, to restrain rotation of said mating ring relative to said second casing member and to prevent axial separation of said casing members under the force of said spring means.

14. A self-contained seal for a pair of relatively rotatable parts, comprising a first annular casing member adapted to be disposed in fixed relation to one of said parts, a second annular casing member mounted in coaxial, axially telescoped relation to said first casing member and adapted to be disposed in fixed relation to the other of said parts, a sealing ring associated in concentric, axially movable relation to said first casing member, means restraining relative rotation of said sealing ring and said first casing member, a flexible annular sealing diaphragm secured at opposite margins to said sealing ring and said first casing member, a mating ring loosely disposed in and axially abutted and sustained by said second casing member for relatively rotative engagement with said sealing ring, and spring means acting axially between said sealing ring and said first casing member to urge said rings against one another and to maintain said mating ring in axial abutment with said second casing member, said second casing member having a sleeve portion provided with integral elements engaging said mating ring and said first casing member, respectively, to restrain rotation of said mating ring relative to said second casing member and to prevent axial separation of said casing members under the force of said spring means.

*15. A self-contained seal for a pair of relatively rotatable parts, comprising an annular casing member adapted for mounting to one of said parts against rotation relative thereto, said casing member having an axially extending portion formed integral therewith and defining the inner surface of said seal to be received about a shaft, a sealing ring received about the outer periphery of said axially extending portion, said sealing ring being movable in an axial direction along said axially extending portion, said casing member including a radially directed end wall portion through which is received at least one pin-like element which is axially directed and which provides one end portion externally of said casing member to mount the same and another end portion received within a recess in said sealing ring internally of said casing member to prevent rotation of said sealing ring relative to said casing member, a mating ring received about the outer periphery of said axially extending portion and being axially movable therealong in the unmounted condition of said seal, means associated with said mating ring to mount the same to the other of said parts against rotation relative thereto, spring means carried between said casing member and said sealing ring and urging said sealing ring into radial face-to-face contact with said mating ring, and outwardly directed lug means forming a part of said axially extending portion near the free edge thereof and projecting into the path of axial movement of said mating ring along said axially extending portion to contact the same and prevent axial separation of said mating ring from said casing member in the unmounted condition of said seal.*

*16. A self-contained seal for a pair of relatively rotatable parts, comprising an annular casing member adapted for mounting to one of said parts against rotation relative thereto, said casing member having an axially extending portion formed integral therewith and defining the inner surface of said seal to be received about a shaft, a sealing ring received about the outer periphery of said axially extending portion, said sealing ring being movable in an axial direction along said axially extending portion, said casing member including a radially directed end wall portion through which is received at least one pin-like element which is axially directed and which provides one end portion externally of said casing member to mount the same and another end portion received within a recess of said sealing ring internally of said casing member to prevent rotation of said sealing ring relative to said casing member, a diaphragm interconnecting said sealing ring with said casing member, a mating ring assembly received about the outer periphery of said axially extending portion and being axially movable therealong in the unmounted condition of said seal, means associated with said mating ring assembly to mount the same to the other of said parts against rotation relative thereto, spring means carried between said casing member and said sealing ring and urging said sealing ring into radial face-to-face contact with a mating surface of said mating ring assembly, and outwardly directed lug means forming a part of said axially extending portion near the free edge thereof and projecting into the path of axial movement of said mating ring assembly along said axially extending portion to contact means forming a part thereof and prevent axial separation of said mating ring assembly from said casing member in the unmounted condition of said seal.*

*17. A self-contained seal for mounting between a pair of opposed radial portions of relatively rotatable parts in axially spaced relation surrounding a shaft, said seal comprising a first annular casing member adapted for mounting to one of said parts against rotation relative thereto, said first casing member having a radially directed end wall portion and an axially extending portion formed integral therewith and defining the inner surface of said seal to be received about said shaft in radially spaced relation thereto, a sealing ring received about the outer periphery of said axially extending portion in as-*

*sociation with said end wall portion, said sealing ring being movable in an axial direction along said axially extending portion and being held against rotation relative to said first casing member by engaging means carried by said first casing member, a diaphragm interconnecting said sealing ring with the end wall portion of said first casing member, a mating ring received about the outer periphery of said axially extending portion and being axially movable therealong in the unmounted condition of said seal, a second casing member associated with said mating ring to mount the same to the other of said parts against rotation relative thereto, said second casing member including an annular recess in which said mating ring is loosely received, spring means carried between the end wall portion of said first casing member and said sealing ring and urging said sealing ring into radial face-to-face contact with said mating ring to axially abut and sustain said mating ring in the recess of said second casing mem-*

*ber, and radially outwardly directed lug means forming a part of said axially extending portion near the free edge thereof and projecting into the path of axial movement of said mating ring along said axially extending portion to contact the same and prevent axial separation of said mating ring from said first casing member in the unmounted condition of said seal.*

References Cited in the file of this patent or the original patent

UNITED STATES PATENTS

| | | |
|---|---|---|
| 2,322,834 | Dernhofer | June 29, 1943 |
| 2,472,264 | Payne | June 7, 1949 |
| 2,489,781 | Isenbarger | Nov. 29, 1949 |
| 2,500,898 | Hastings | Mar. 14, 1950 |
| 2,615,739 | Vedovell | Oct. 28, 1952 |